United States Patent
Herbert et al.

(10) Patent No.: US 6,188,315 B1
(45) Date of Patent: Feb. 13, 2001

(54) SITUATIONAL FEATURE SUPPRESSION SYSTEM

(75) Inventors: Martin John Herbert, Great Waltham; Malcolm Williams, West Midlands; Richard Dennis Shelton, Coventry, all of (GB)

(73) Assignee: Jaguar Cars, Limited, Whitley Coventry (GB)

( * ) Notice: Under 35 U.S.C. 154(b), the term of this patent shall be extended for 0 days.

(21) Appl. No.: 09/304,904

(22) Filed: May 4, 1999

(30) Foreign Application Priority Data

Jul. 5, 1998 (GB) .................................................. 9809632

(51) Int. Cl.⁷ .................................................. B60Q 1/00
(52) U.S. Cl. ..................... 340/438; 340/461; 340/995; 701/1
(58) Field of Search ..................... 340/438, 995, 340/461, 815.41, 902; 701/1

(56) References Cited

U.S. PATENT DOCUMENTS

| | | | |
|---|---|---|---|
| 4,812,843 | * | 3/1989 | Champion, III et al. ............. 340/905 |
| 5,504,482 | * | 4/1996 | Schreder ............................... 340/905 |
| 5,631,638 | * | 5/1997 | Kaspar et al. ........................ 340/902 |
| 5,719,771 | * | 2/1998 | Buck et al. ........................... 364/443 |
| 5,764,139 | * | 6/1998 | Nojima et al. ........................ 340/461 |
| 5,794,164 | * | 8/1998 | Beckert et al. ........................... 701/1 |
| 5,821,880 | * | 10/1998 | Morimoto et al. .................... 340/995 |
| 5,949,345 | * | 9/1999 | Beckert et al. ................. 340/815.41 |

FOREIGN PATENT DOCUMENTS

| | | |
|---|---|---|
| 42 39 271 | 10/1993 | (DE) . |
| 41 26 435 | 9/1995 | (DE) . |
| 44 10 532 | 9/1995 | (DE) . |
| 0 545 497 | 6/1993 | (EP) . |
| 10 090390 | 4/1998 | (JP) . |

OTHER PUBLICATIONS

Patent Abstracts of Japan (vol. 1998, No. 09, Jul. 31, 1998).

* cited by examiner

*Primary Examiner*—Daniel J. Wu
*Assistant Examiner*—Phung Nguyen

(57) ABSTRACT

A situational feature suppression system 1 for a vehicle including at least one in-car incidental feature means 3. The suppression system 1 comprises at least one driving condition measuring unit 5, 7, 9, coupled to a control unit 11 for receiving signals from the or each driving condition measuring unit 5, 7, 9, and interpreting the signals to assess whether a relevant condition exists. The control unit 11 is also coupled to the incidental feature means 3. The system operates such that on identification of a relevant condition, the control unit 11 operates to suppress the incidental feature means 3.

11 Claims, 1 Drawing Sheet

SITUATIONAL FEATURE SUPPRESSION SYSTEM

FIELD OF THE INVENTION

The present invention relates to a system for suppressing features or functions of in-vehicle accessories when certain environmental factors are present. The invention is applicable with particular advantage to enhancing operation of an in-car telephone during predetermined driving conditions.

When properly used, in-car communications equipment such as mobile phones provide very desirable user capabilities and achieve safety benefits, e.g. summoning help in an emergency. However, the possibility exists that a careless user may operate such equipment in an improper manner. Thus, it is desirable to enhance the ability to operate the equipment with increased safety.

There are many different types of units available and fitted as standard in some vehicles which can provide information about environmental driving conditions, such as navigation systems, adaptive cruise control systems, and rain sensors. The term 'driving condition measuring unit' will be used to encompass all such systems as well as any unit capable of measuring the operation of the vehicle such as a speedometer, a braking detector, a unit for detecting the angle of turn of the vehicle, or especially any other device which can provide a signal which can indicate the presence of conditions related to the level of immediate driving tasks being handled by a driver.

The term 'relevant condition' is used herein to cover any driving condition where the task level of a driver may lead to careless use of an in-vehicle function or feature, for example when driving at high speeds, in bad weather, in heavy traffic, when negotiating a sharp bend or when in a complex road layout requiring concentration.

Mobile telephone operation is not the only non-driving function or feature subject to possible careless use. Many vehicles are fitted with sophisticated in-car entertainment systems. As these become more sophisticated offering more adjustments to the driver, some drivers may fail to utilize sufficient care while operating the entertainment system. Moreover, other features and accessories are being developed to allow the driver to work on the move, for example, in-vehicle computers allowing access to the Internet, faxes, and e-mail. The term 'incidental features' encompasses all such systems.

SUMMARY OF THE INVENTION

According to the invention there is provided a situational feature suppression system for a vehicle including at least one incidental feature means, the suppression system comprising at least one driving condition measuring unit coupled to a control unit for receiving signals from the driving condition measuring unit and interpreting the signals to assess whether a relevant condition exists. The control unit is coupled to the incidental feature means. The system operates such that on identification of a relevant condition, the control unit operates to suppress the incidental feature means.

Typically, the incidental feature means comprises an in-car telephone. However, the incidental feature means may comprise any system requiring real-time responses from the driver or significant concentration on adjusting controls or inputs such as a standard in-car entertainment system, including a radio, tape player and/or a compact disc player. Preferably, however, the incidental feature means comprises the telephone and the in-car entertainment system so that both systems are suppressed in relevant conditions.

In some known systems, the in-car telephone system is coupled to the in-car entertainment (ICE) center such that its audio is routed through the ICE center. In such systems, the phone system may provide an output control signal to the ICE center when a phone call is made so that there is a 'mute' effect of the audio signal from the radio/cassette to allow phone conversation to take place, thus giving priority to the telephone over the ICE system. It is preferred that the 'mute' signal is also provided to the control unit to indicate that the telephone is in use. In such a system, the control unit only operates the suppression if the telephone is in use.

Preferably, the driving condition measuring unit comprises an on-board navigation system which allows the position of the vehicle to be determined with a high degree of accuracy. Typically, such a system includes a GPS system operating via global positioning satellites.

Preferably, the control unit receives information from a plurality of driving condition measuring units, one of which is a navigation system. Other possible driving condition measuring units include a telematic radio receiver for receiving information from a remote source relating to traffic and road conditions, and speed and braking sensors.

The control unit is programmed to assess the driving conditions from the signals from the measuring units to identify a relevant condition. For example, a highway ramp, roundabout, or complex road junction could be identified by a navigation system. Heavy traffic in a particular area could be identified by the navigation computer pinpointing the location of the vehicle and remote telematics identifying a traffic problem in a particular area. Sensors and/or vehicle-to-vehicle communications systems monitoring vehicles near the subject vehicle can also identify heavy traffic conditions. Bad weather can be identified by the use of a rain sensor, or alternatively by relying on remote identification of weather conditions in particular areas, such information being relayed to the vehicle. High speeds can be identified by the vehicles own in-car computer. Also telematic traffic information can identify locally enforced restriction of car phone use, etc.

The control unit may suppress the incidental feature means in a number of ways. For an in-car entertainment center, the volume can be turned down or off. Preferably, however, the control unit operates to switch off the incidental feature means only until the relevant condition ends and then switches it back on again when the relevant condition no longer exists.

In the case outlined where the incidental feature means comprises a telephone routed through the ICE center, preferably the 'mute' signal is passed to the control unit so that the control unit 'knows' whether the telephone is in use. In this case, the suppression system only operates when the telephone is in operation.

Preferably, the unit is arranged to have at least one recorded message in its memory. The suppression triggers the playing of the message to inform the driver that the incidental feature means is being switched off during the relevant condition. The advantage of this over purely switching off is that the driver will immediately know that the phone is off and not worry if there has been any other line interruption, but also will permit him to concentrate on the relevant condition.

Preferably, the message will also inform the remote caller that the call is being interrupted and that the call is on temporary hold. Preferably, the control unit operates to restore the call from hold or to redial the number of a lost call when the relevant condition no longer exists.

The system may be a stand-alone system which can be installed in a vehicle as an aftermarket addition, requiring connection of the control unit to a number of existing systems in the vehicle, or alternatively may form part of the vehicles on-board computer.

BRIEF DESCRIPTION OF THE DRAWINGS

A situational feature suppression system will now be described, by way of example only, with reference to the accompanying drawings, in which:—

DETAILED DESCRIPTION OF PREFERRED EMBODIMENTS

Figure 1:
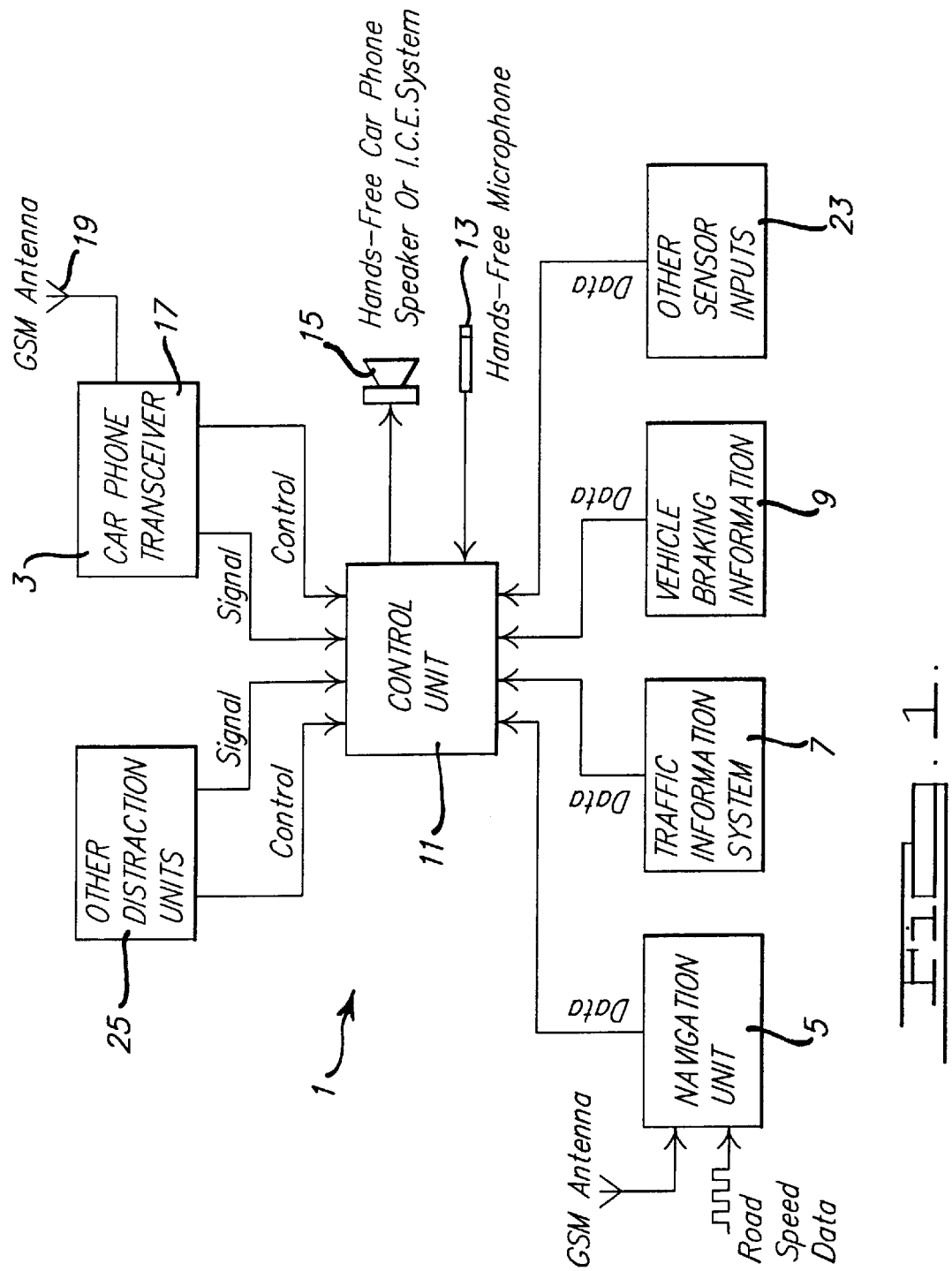
FIG. 1 is a schematic block diagram of the system.

There is provided a situational feature suppression system 1 for a vehicle including at least one in-car incidental feature means 3, the suppression system 1 comprising at least one driving condition measuring unit 5, 7, 9, coupled to a control unit 11 for receiving signals from the or each driving condition measuring unit 5, 7 ,9 and interpreting the signals to assess whether a relevant condition exists. The control unit 11 is also coupled to the incidental feature means 3. The system operates such that on identification of a relevant condition the control unit 11, the incidental feature means 3 is suppressed.

When the phone is in use, this produces a 'mute' signal to switch off any other audio output such as the car radio. This 'mute' signal is also sent to the control unit 11 to identify that the telephone is in use.

In this case, the incidental feature means 3 is an in-car telephone, comprising a hands free microphone 13 and a speaker 15. This could be a separate speaker for the telephone but in this case is the speaker of the ICE center (not shown) so that the audio of the telephone plays through the entertainment center. The telephone system 3 also comprises a transceiver 17 through which the telephone message reaches the network via a GSM antenna 19.

When the telephone system 3 is in use, the mute line of the ICE switches the phone output to its speakers 15 so that the audio entertainment output is temporarily switched off. Thus, when the control unit 11 operates to switch off the output of the speakers 15 in the event of a relevant condition, the phone output will be turned off if it is being used, or the audio system output if not.

The driving condition measuring units comprise a navigation unit 5 (which receives data relating to the position of the vehicle via a GPS antenna 21 and the vehicle's speed), a traffic information system 7, and a sensor unit 9 which detects the vehicles braking status. Each unit 5, 7, and 9 is coupled to the control unit 11 to send data relating to the driving condition. The control unit 11 may also be connected to it additional units 23 which carry information from other sensors such as IR cameras, radar, lidar or via vehicle-to-vehicle communications.

The control unit 11 is programmed to receive the driving condition data and to follow through a number of algorithms to identify a relevant condition. The algorithm will include means to flag when the navigation unit 5 senses that the vehicle is approaching the location of a potential accident area, such as a highway ramp, or a complex road junction, such as a roundabout. The vehicle speed will also be taken into account. If the speed is over a first threshold, and the vehicle is approaching any junction, then a relevant condition may be identified. Additionally, if the speed is over a second higher threshold, this is sufficient for a relevant condition to exist.

Data from the traffic information system 7 flags when there is an accident or a traffic jam in a particular upcoming location. This data is then combined with data from the navigation unit 5 to pinpoint the vehicle's location so that when the control unit 11 identifies that the vehicle is approaching the location, a relevant condition is identified.

Data from unit 9 identifies when the vehicle is braking sharply. This is taken by the control unit 11 to identify a relevant condition.

The control unit 11 is programmed to automatically switch off the telephone on identification of a relevant condition and to send a suppression signal to the speaker 15 and the transceiver 17. Also the control unit 11 includes in its memory a prerecorded message stating:

"This telephone call is being interrupted due to a present condition".

The control unit 11 is programmed to play this message both to the driver and to the remote caller. The unit 11 is arranged to store the number of the remote caller and to redial the number when the relevant condition no longer exists.

The system is arranged to be flexible, so that additional sensor units 23 can be connected to the control unit 11, dependent upon which sensors are mounted within the vehicle. Similarly, if the vehicle is fitted with other incidental feature means 25 such as a computer allowing communication via the internet, e-mail or fax, this also may be coupled to the control unit 11 and suppressed during relevant conditions in the same way that the phone is suppressed.

What is claimed is:

1. A situational feature suppression system for a vehicle having at least one in-vehicle incidental feature or function, the suppression system comprising:

at least one in-vehicle incidental feature means for implementing the incidental feature or function;

at least one driving condition measuring unit for generating signals indicative of a relevant condition, the relevant condition being defined as any driving condition where the task level of a driver may lead to careless use of an in-vehicle function or feature; and a control unit coupled to the driving condition measuring unit and said incidental feature means, said control unit comprising means for interpreting the signals to assess whether the relevant condition exists, and means for automatically suppressing the incidental feature means to minimize distractions to the driver during the occurrence of the relevant condition.

2. The system according to claim 1, wherein said incidental feature means comprises an in-vehicle telephone and an in-vehicle entertainment center.

3. The system according to claim 1 wherein said incidental feature means comprises an in-vehicle computer for operating internet, E-mail or fax communication.

4. The system according to claim 1 wherein said driving condition measuring unit comprises a navigation unit and a global position system (GPS) antenna coupled thereto.

5. The system according to claim 1, wherein said incidental feature means comprises a speaker that is switched off in response to the relevant condition.

6. The system according to claim 5, further comprising an audible interruption message that is broadcast through the speaker prior to the switching off of the speaker.

7. A method for operating at least one in-vehicle incidental feature means, the method comprising:

using at least one driving condition measuring unit to generate signals indicative of driving conditions;

interpreting the signals to assess whether a relevant condition exists, the relevant condition being defined any driving condition where the task level of a driver may lead to careless use of an in-vehicle function or feature; and automatically suppressing operation of the incidental feature means based on the relevant condition so as to minimize distractions to the driver during the occurrence of the relevant condition.

8. A method for operating an in-vehicle telephone having a speaker and a transceiver, the method comprising:

using at least one driving condition measuring unit to generate signals indicative of driving conditions;

interpreting the signals to assess whether a relevant condition exists, the relevant condition being defined as any driving condition where the task level of a driver may lead to careless use of an in-vehicle function or feature;

generating a suppression signal based on the relevant condition; and sending the suppression signal to one or both of the speaker and transceiver to automatically suppress the operation of the telephone so as to minimize distractions to the driver during the occurrence of the relevant condition.

9. The method according to claim 8, further comprising the step of broadcasting an audible interruption message over the speaker, said broadcasting step being triggered by the suppression of telephone operation.

10. The method according to claim 8, further comprising the step of broadcasting an audible interruption message to a remote caller, said broadcasting step being triggered by the suppression of telephone operation.

11. The method according to claim 10, further comprising:

storing the remote caller's telephone number; and redialing the stored telephone number when the relevant condition no longer exists.

* * * * *